(12) United States Patent
Ciou (10) Patent No.: US 11,486,345 B1
(45) Date of Patent: Nov. 1, 2022

(54) WAVE ENERGY CONVERTING DEVICE

(71) Applicant: Lin-Tu Ciou, Douliu (TW)

(72) Inventor: Lin-Tu Ciou, Douliu (TW)

( * ) Notice: Subject to any disclaimer, the term of this patent is extended or adjusted under 35 U.S.C. 154(b) by 221 days.

(21) Appl. No.: 17/353,689

(22) Filed: Jun. 21, 2021

(51) Int. Cl.
*F03B 13/18* (2006.01)
*F03D 15/10* (2016.01)

(52) U.S. Cl.
CPC .......... *F03B 13/1875* (2013.01); *F03D 15/10* (2016.05)

(58) Field of Classification Search
CPC .............................. F03B 13/1875; F03D 15/10
See application file for complete search history.

(56) References Cited

U.S. PATENT DOCUMENTS

2009/0230684 A1* 9/2009 Gasendo ............... F03B 13/186
74/DIG. 9

* cited by examiner

*Primary Examiner* — Viet P Nguyen (57) ABSTRACT

A wave energy converting device has a driving unit, a gearing unit, an operating unit, a transmission unit and an energy converting device. The fluctuation potential generated by the ocean waves drives the floating member of the driving unit to move up and down, and then the fluctuation potential energy is converted into a rotational kinetic energy through the gearing unit, the operating unit and the transmission unit, which is then used for power generation and the unit is driven to change between the first and second operating gear with the increase and decrease of the potential energy of the waves, so that the transmitting shaft can generate energy through the rotation of the first transmitting gear and the second transmitting gear.

6 Claims, 10 Drawing Sheets

WAVE ENERGY CONVERTING DEVICE

BACKGROUND OF INVENTION

1. Field of Invention

The present invention relates to an energy converting device, and more particularly to an ocean wave energy converting device.

2. Description of the Related Art

Currently, the conventional technologies for converting nature resource for generating electricity are nuclear power and thermal power. Nuclear power generation is the use of heavy nuclear fuel (ie U-233, U-235 and Pu-239) in the nuclear reactor to split the heat generated during the chain reaction, and then use the heat to directly generate steam or lead to a heat exchanger to generate steam, to convert heat energy into electrical energy. However, the cost of the heavy nuclear tends to rise, also the cost of building nuclear power generation plants is quite high, causing many developmental country unable to build power plants. When the nuclear power is used to generate electricity, there are two serious problems: one is the accumulation and disposal of nuclear waste, and the other is the impact on the surrounding environment. Thermal power generation is mainly based on burning coal, petroleum and other fuels to produce water steam to generate electricity. Using coal as the energy source for thermal power generation is very easy to cause the emission of air pollutants such as dust, sulfur dioxide, nitrogen oxides (NOX) and carbon dioxide and waste water and the like. Therefore, good environmental protection measures are required to prevent air pollution. In summary, nuclear power and thermal power generation have serious problems such as radioactive waste, air pollution, greenhouse effect, resource shortage crisis, serious impact on the ecological environment, and water pollution.

Therefore, it is desirable to provide an wave energy converting device to mitigate and/or obviate the aforementioned problems.

SUMMARY OF THE INVENTION

An objective of present invention is to provide a wave energy converting device.

To achieve these and other objects of the present invention, A wave energy converting device has a driving unit, a gearing unit, an operating unit, a transmission unit and an energy converting device. The fluctuation potential generated by the ocean waves drives the floating member of the driving unit to move up and down, and then the fluctuation potential energy is converted into a rotational kinetic energy through the gearing unit, the operating unit and the transmission unit, which is then used for power generation and the unit is driven to change between the first and second operating gear with the increase and decrease of the potential energy of the waves, so that the transmitting shaft can generate energy through the rotation of the first transmitting gear and the second transmitting gear.

Other objects, advantages, and novel features of invention will become more apparent from the following detailed description when taken in conjunction with the accompanying drawings.

DETAILED DESCRIPTION OF THE PREFERRED EMBODIMENT

Figure 1:
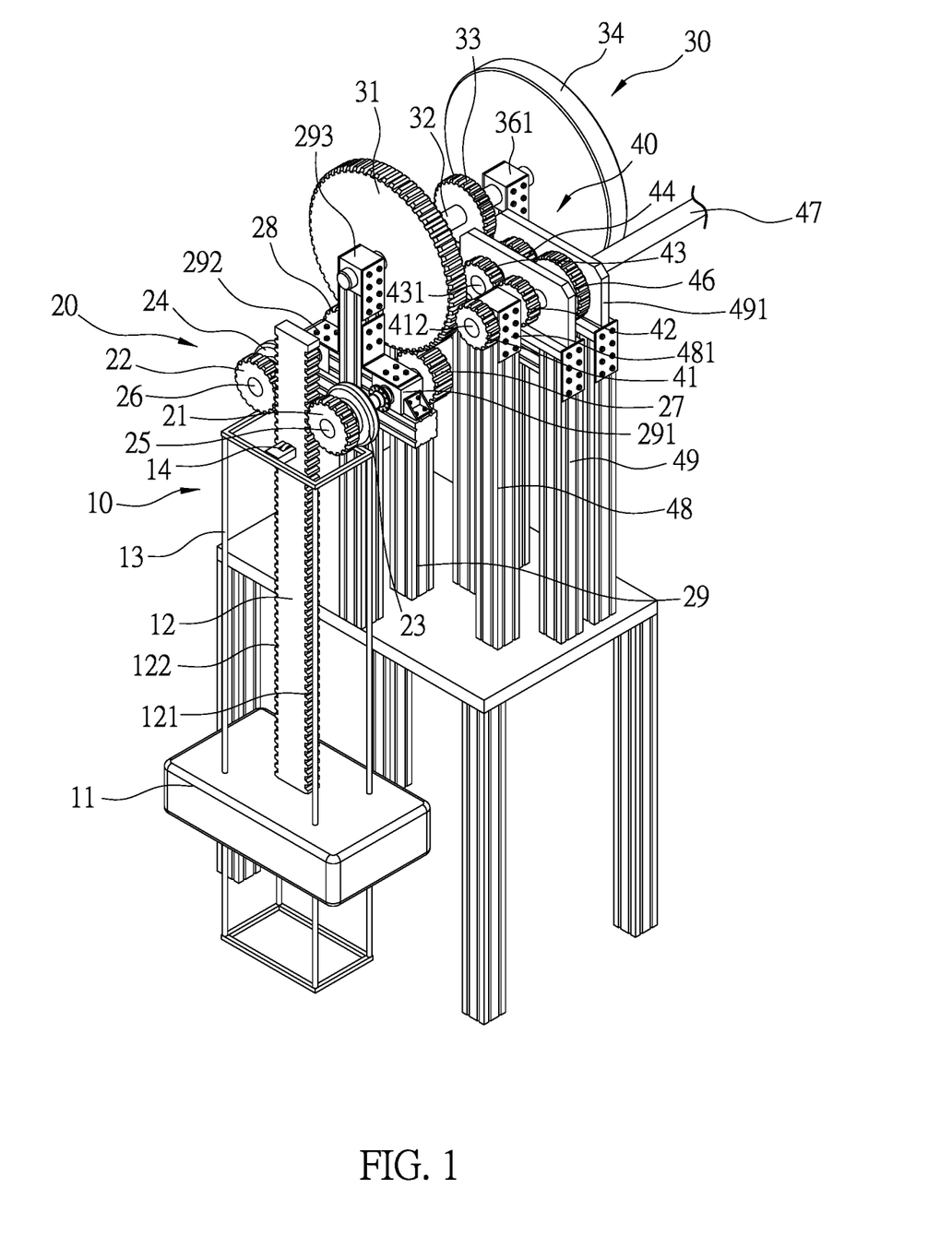
FIG. 1 is a perspective view of a preferred embodiment according to the present invention.
Figure 2:
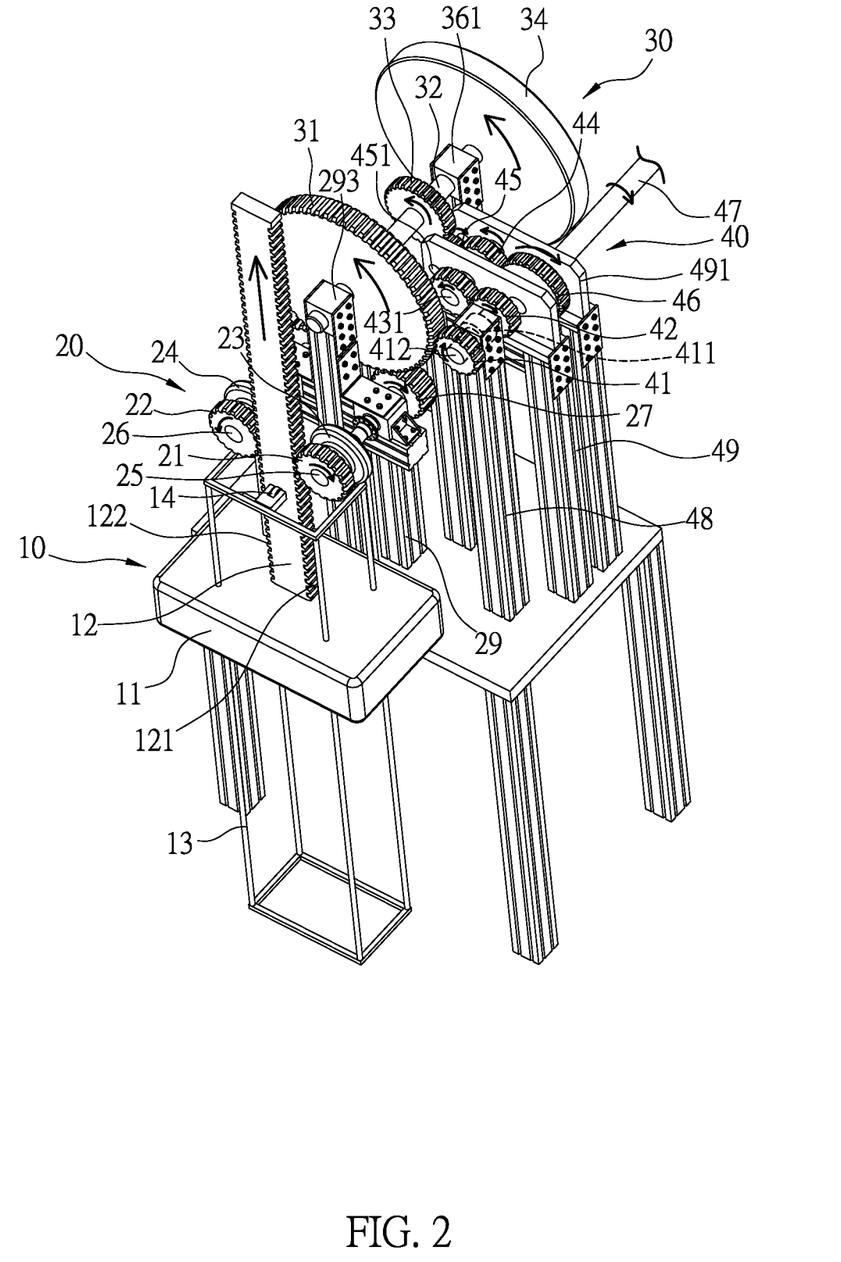
FIG. 2 is a schematic diagram of the ascending displacement of the floating member of the preferred embodiment according to the present invention.
Figure 3:
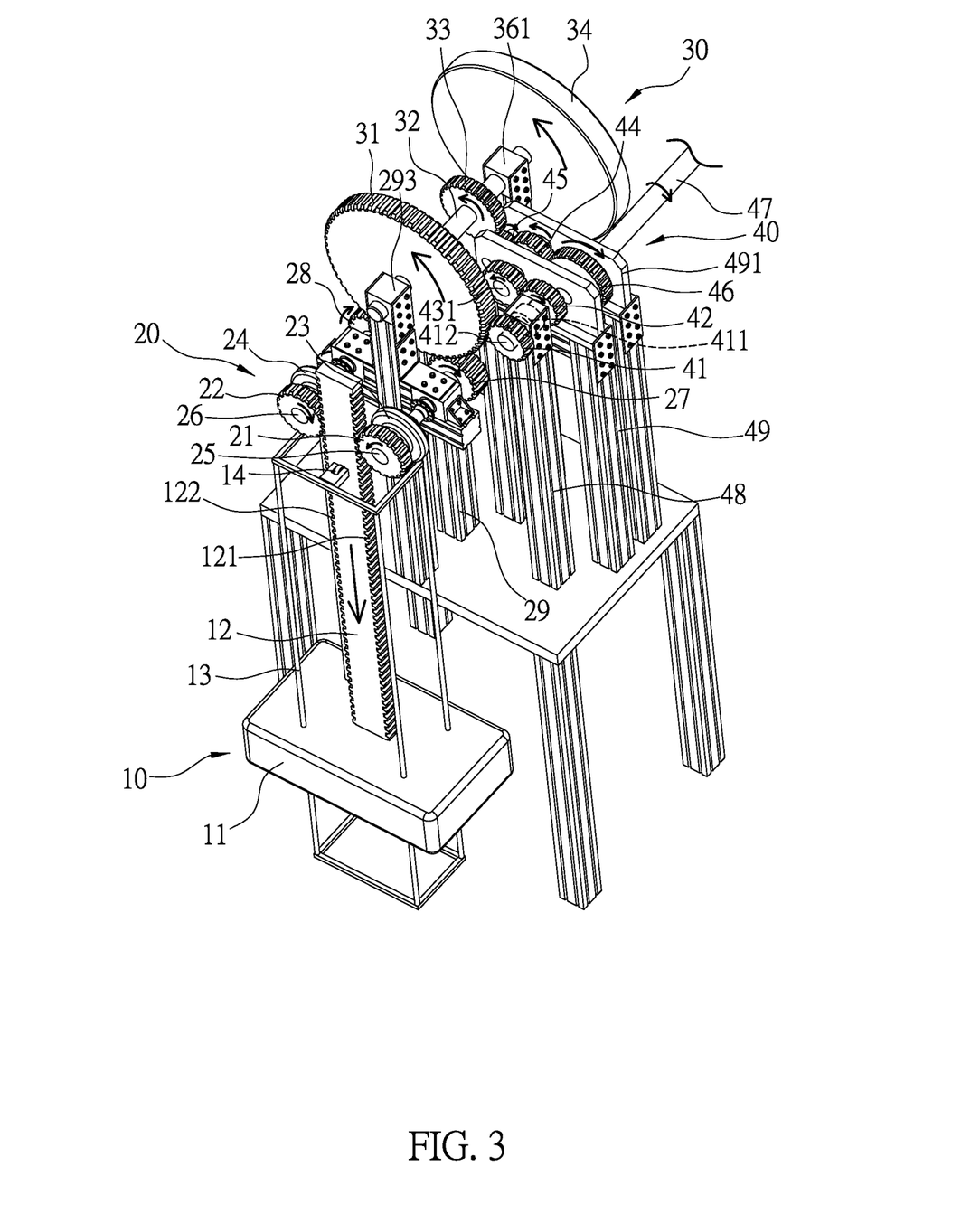
FIG. 3 is a schematic diagram of the descending displacement of the floating member of the preferred embodiment according to the present invention.
Figure 4:
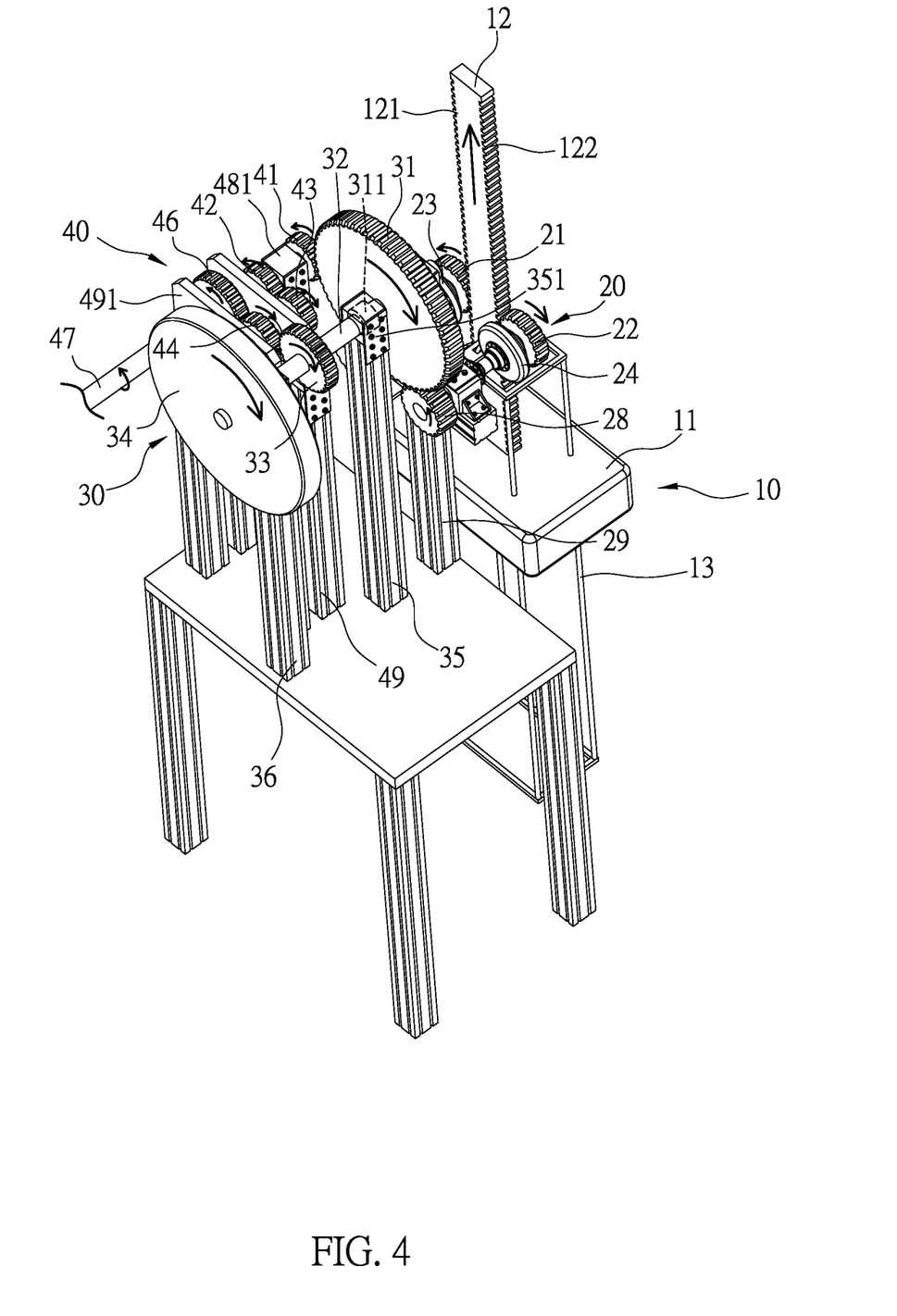
FIG. 4 is a schematic diagram of the floating member ascending displacement from another perspective of the preferred embodiment according to the present invention.
Figure 5:
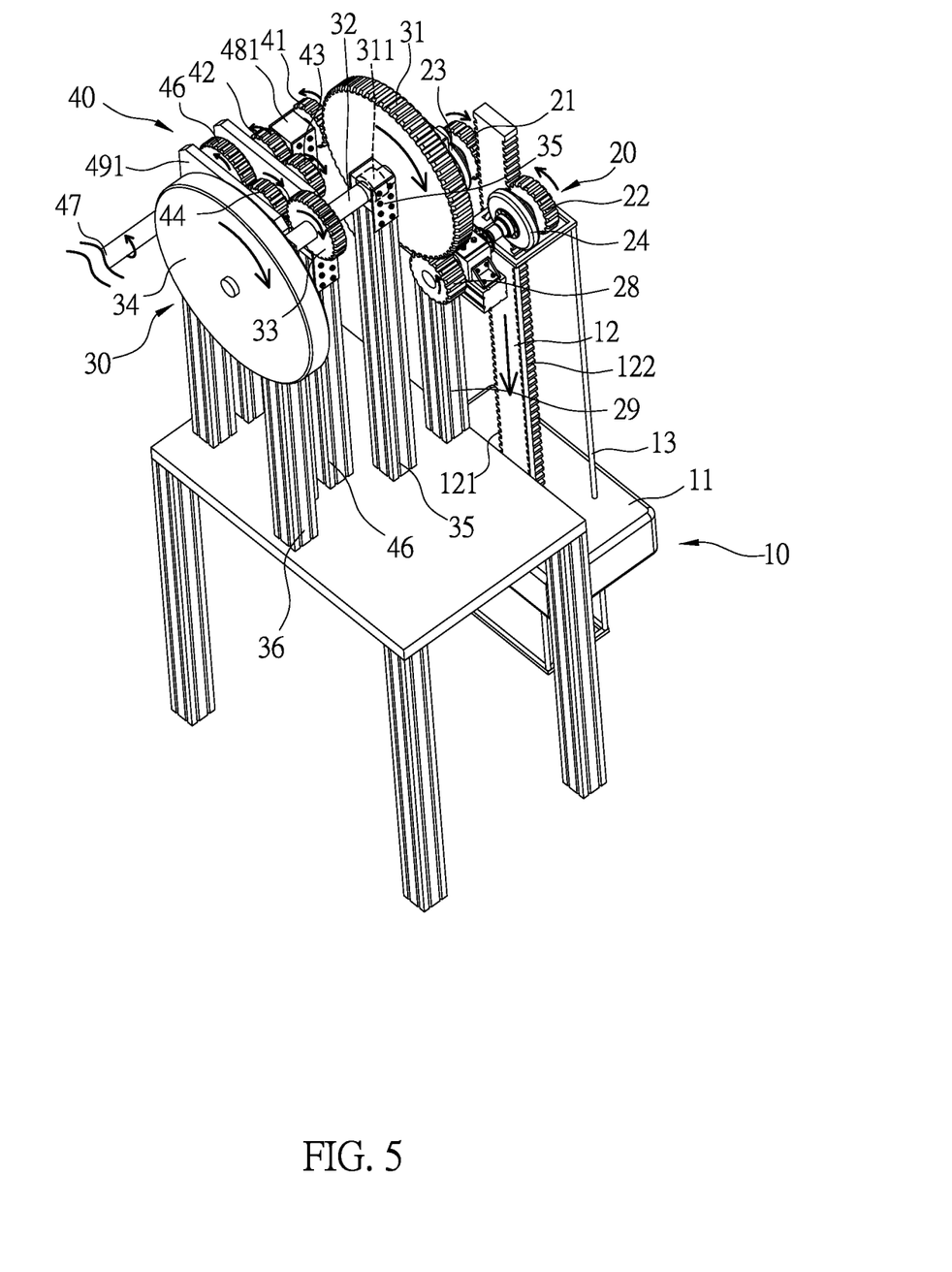
FIG. 5 is a schematic diagram of the floating member ascending displacement from another perspective of the preferred embodiment according to the present invention.
Figure 6:
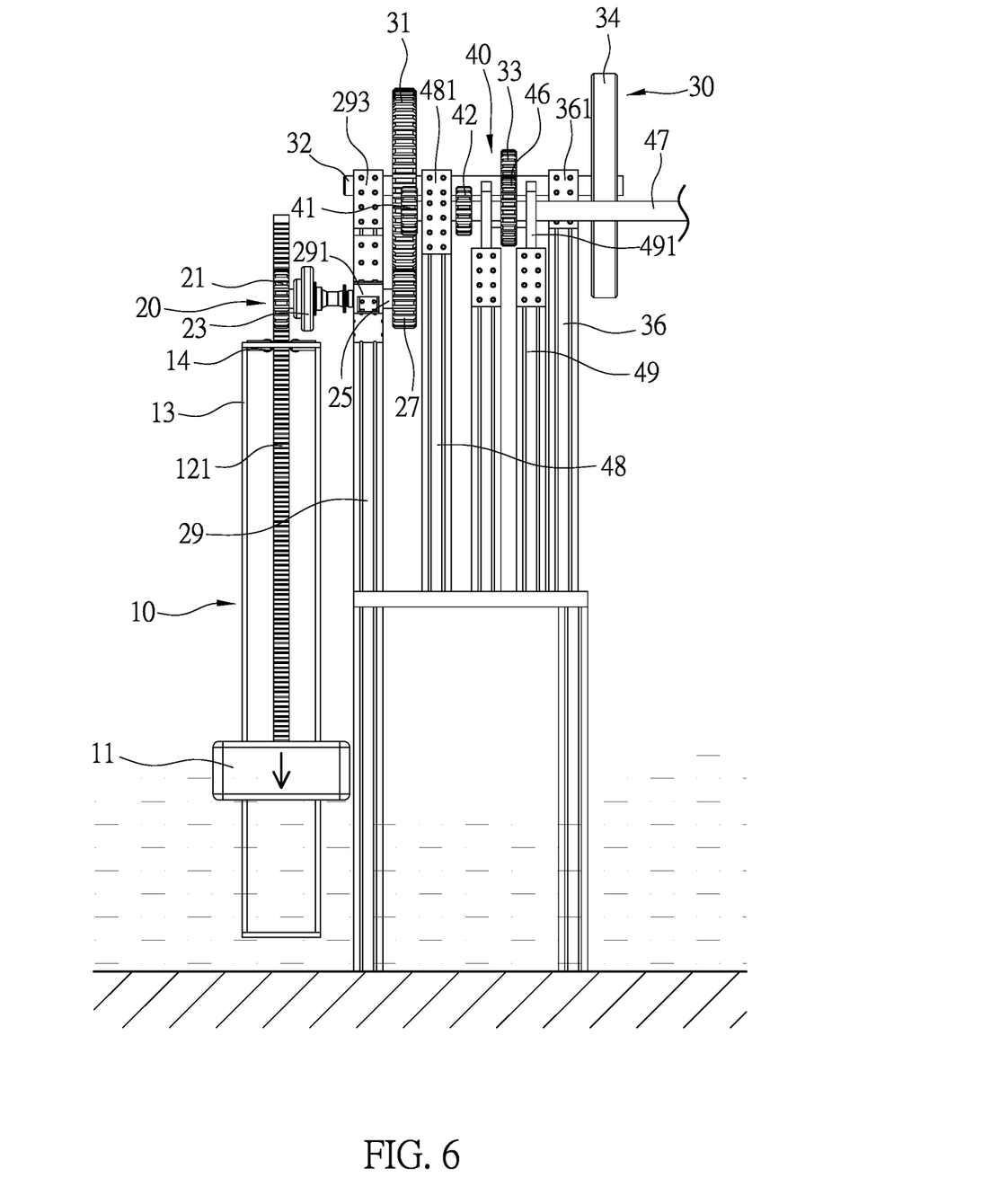
FIG. 6 is a side view of the floating member descending displacement of the preferred embodiment according to the present invention.
Figure 7:
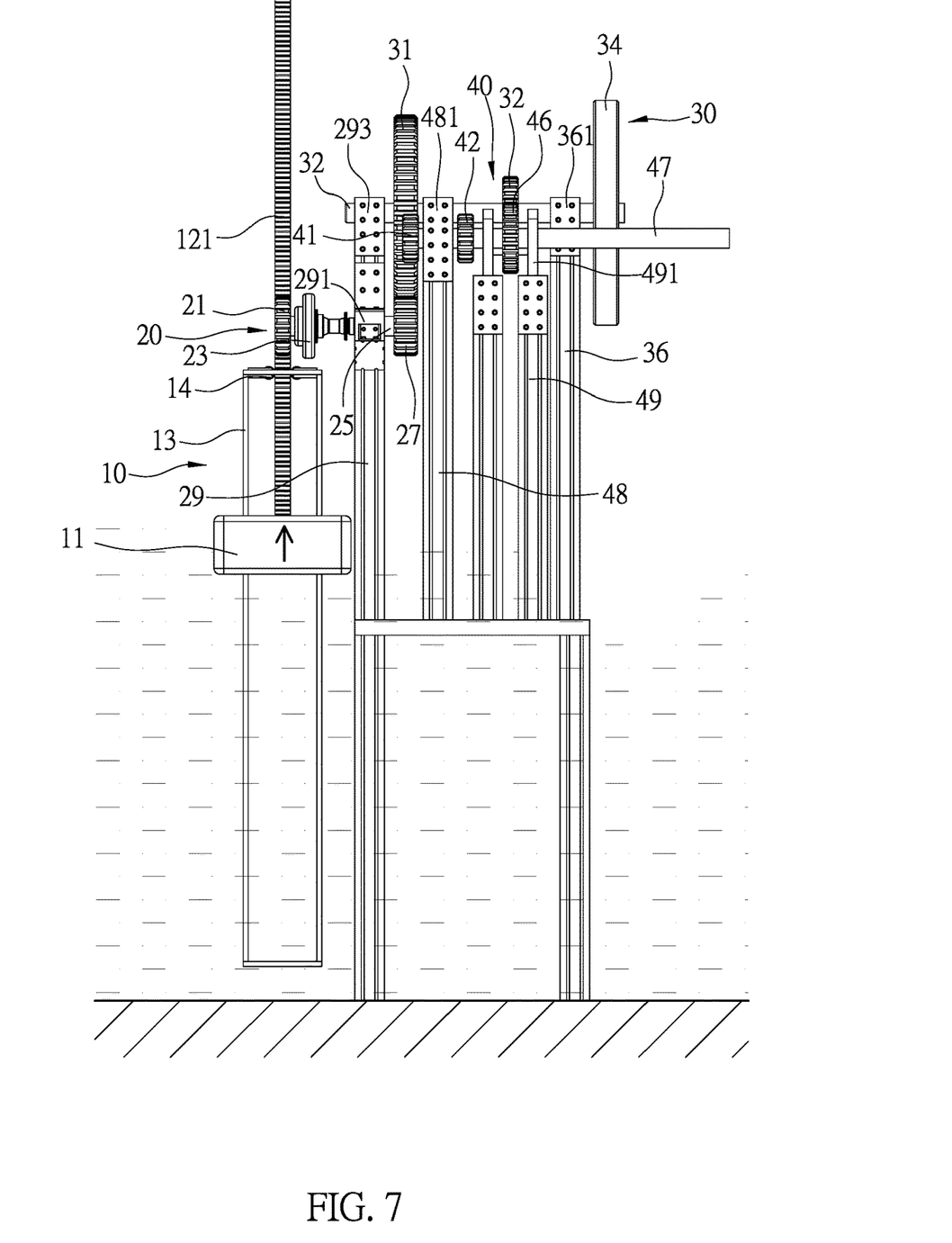
FIG. 7 is a side view of the floating member ascending displacement of the preferred embodiment according to the present invention.
Figure 10:
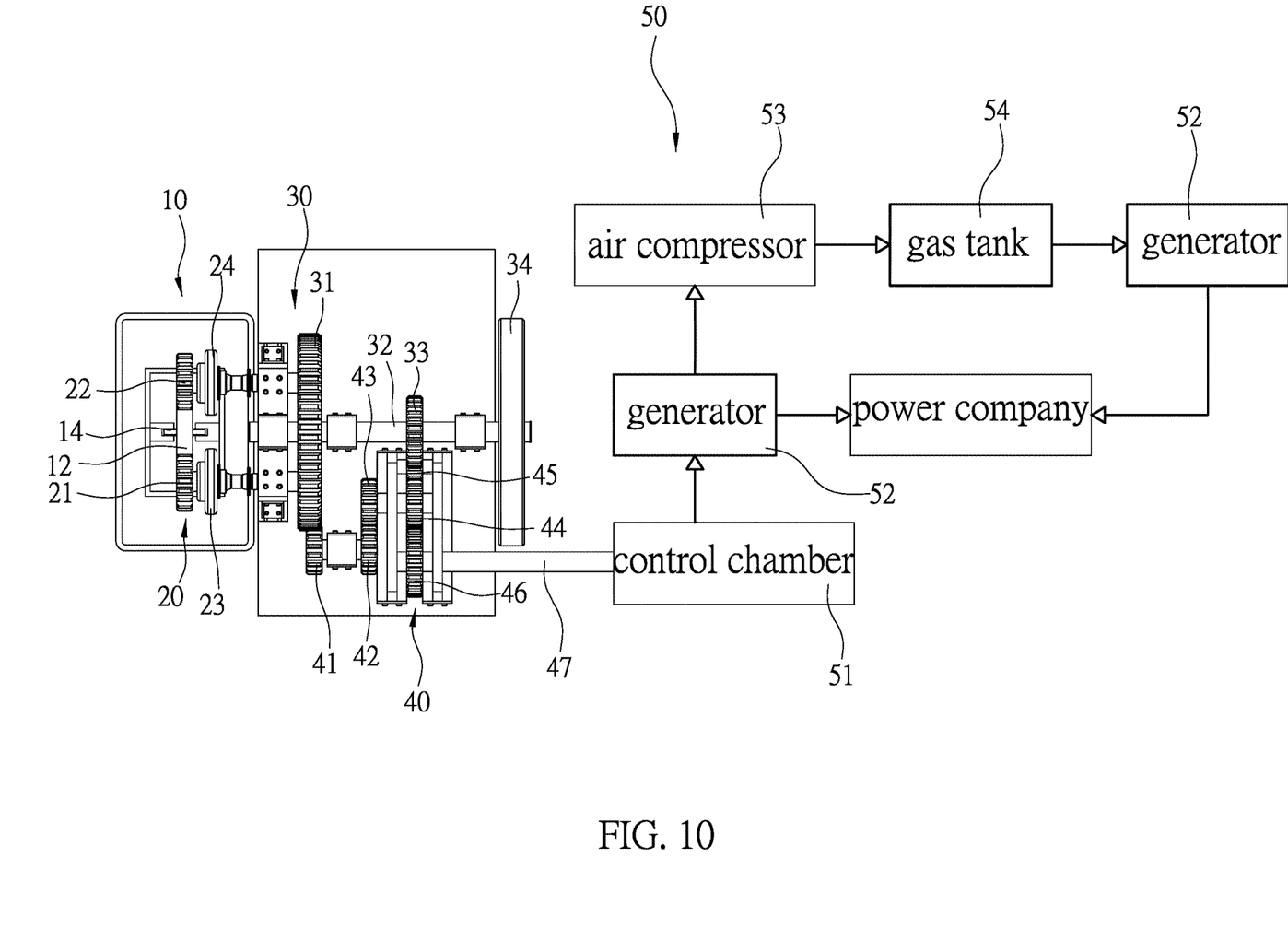
FIG. 10 is a schematic diagram of the energy conversion process of the preferred embodiment according to the present invention.

As shown in FIGS. 1, 2 and 4, a wave energy converting device comprises: a driving unit 10, a gearing unit 20, an operating unit 30, a transmission unit 40 and an energy converting device 50. The driving unit 10 has a floating member 11 with a driving column 12, and two sides of the driving column 12 respectively have a first toothed section 121 and a second toothed section 122. The driving unit 10 further has a vertical track 13, and the floating member 11 is configured to move vertically along the vertical track 13. The vertical track 13 further has two guiding wheels 14, and the two guiding wheels 14 abut two sides of the driving column 12. The gearing unit 20 has a first gear 21 and a second gear 22, the first and second gears 21, 22 respectively engage with the first and second toothed section 121, 122 of the driving column 12. The first gear 21 is assembled with a first one-way bearing 23, the second gear 22 is assembled with a second one-way bearing 24, and the first and second one-way bearings 23, 24 are configured to rotate in a same direction. Furthermore, the first and second gear 21, 22 is respectively connected to an end of a first linking shaft 25 and a second linking shaft 26 with the first and second one-way bearings 23, 24. Another end of the first linking shaft 25 is connected to a third gear 27, and another end of the second linking shaft 26 is connected to a fourth gear 28. Moreover, the gearing unit 20 is installed on a first the supporting structure 29, the first supporting structure 29 comprises a first the bearing seat 291 and a second bearing seat 292 at a same height, and the first bearing seat 291 and the second bearing seat 292 are configured to accept the first and second linking shafts 25, 26. The first supporting structure 29 further comprising a third bearing seat 293 between the first and second bearing seats 291, 292, and the third bearing seat 293 is installed higher than the first and second bearing seats 291, 292. The operating unit 30 has a first operating gear 31, a driving shaft 32, a second operating gear 33 and an idler wheel 34. The first operating gear 31 engages with the third and fourth gears 27, 28, the first operating gear 31 is coupled with a third one-way bearing 311 and connected to an end of the driving shaft 32 via the third one-way bearing 311. A middle section of the driving shaft 32 engages with the second operating gear 33, and another end of the driving shaft 32 is connected to the idler wheel 34. A circular area of the idler wheel 34 is larger than a circular area of the first operating gear 31. The third bearing seat 293 is configured to accept an end of the driving shaft 32. A second supporting structure 35 is provided between the first operating gear 31 and the second operating gear 33, and the second supporting structure 35 is adjacent to the first operating gear 31 and further comprises a fourth bearing seat 351 on a top for accepting the driving shaft 32. A third supporting structure 36 is installed between the second operating gear 33 and the idler wheel 34, and a fifth bearing seat 361 is mounted on a top of the third supporting structure 36 for accepting another end of the driving shaft 32. The transmission unit 40 has a first transmitting gear 41, a second transmitting gear 42, a third transmitting gear 43, a fourth transmitting gear 44, a fifth transmitting gear 45, a sixth transmitting gear 46 and a transmitting shaft 47. The first transmitting gear 41 engages with the first operating gear 31, and the first transmitting gear 41 is coupled with a fourth one-way bearing 411. The fourth one-way bearing 411 IS connected to a first shaft 412, and another end of the first shaft 412 is connected to the second transmitting gear 42. The second transmitting gear 42 engages with the third transmitting gear 43, and the third transmitting gear 43 is connected to the fourth transmitting gear 44 by a second shaft 431. The fifth transmitting gear 45 and the sixth transmitting gear 46 respectively engage with the fourth transmitting gear 44 on opposite sides, the fifth transmitting gear 45 engages with the second operating gear 33, and the transmitting shaft 47 is paced through the sixth transmitting gear 46. A fourth supporting structure 48 is mounted between the first transmitting gear 41 and the second transmitting gear 42, and a sixth bearing seat 481 is mounted on the fourth supporting structure 48 for accepting the first shaft 412. The fourth, fifth and sixth transmitting gears 44, 45, 46 are mounted on a fifth supporting structure 49, and a housing 491 is mounted on the fifth supporting structure 49. The fourth, fifth and sixth transmitting gears 44, 45, 46 engage with each other and positioned in the housing 491, and the second shaft 431 passes through the housing 491 and the fourth transmitting gear 44. Furthermore, the housing 491 further comprises a third shaft 451 passing through the fifth transmitting gear 45. The energy converting device 50 comprises a control chamber 51, a plurality of generators 52, at least one air compressor 53 and a gas tank 54. As shown in FIG. 10, the energy generated by the transmitting shaft 47 is distributed via the control chamber 51 to the generators 52 and the air compressor 53 connected to the gas tank 54. The gas tank 54 provides the compressed gas to the generator 52 through motor to provide electricity.

For the actual operating state of the structure, please refer to FIGS. 2 to 7, the floating member 11 of the driving unit 10 is floating on ocean surface, and the floating member 11 is configured to be driven by the fluctuation of ocean waves to move up and down along the vertical track 13, and simultaneously drive the driving column 12 up and down, and uses the first and second toothed sections 121, 122 on both sides to engage with the first and second gear 21, 22. When the floating member 11 moves upward along the vertical track 13, the first gear 21 rotates clockwise, and the second gear 22 rotates counterclockwise and drives of the first and second one-way bearings 23, 24 in the same direction, which enables the first gear 21 to engage and drive the first linking shaft 25 to achieve the synchronous rotation of the third gear 27. Then, the third gear 27 drives the first operating gear 31 to rotate to generate kinetic energy, and when the second gear 22 is rotating, the second linking shaft 26 cannot engage with and drive the second linking shaft 26 as in an idling state, so that the fourth gear 28 does not drive the first operating gear 31. On the contrary, when the floating member 11 moves down along the vertical track 13, the first gear 21 rotates counterclockwise, and the second gear 22 rotates clockwise. Now, the first gear 21 cannot engage and drive the first linking shaft 25 as in an idling state, so that the third gear 27 does not drive the first operating gear 31, while the second gear 22 engages and drives the second linking shaft 26 to achieve the synchronous rotation of the fourth gear 28, and the fourth gear 28 drives the first operating gear 31 to generates kinetic energy. Therefore, the floating member 11 is able to effectively drive the first operating gear 31 to rotate through the gearing unit 20 when the waves rise and fall.

Figure 8:
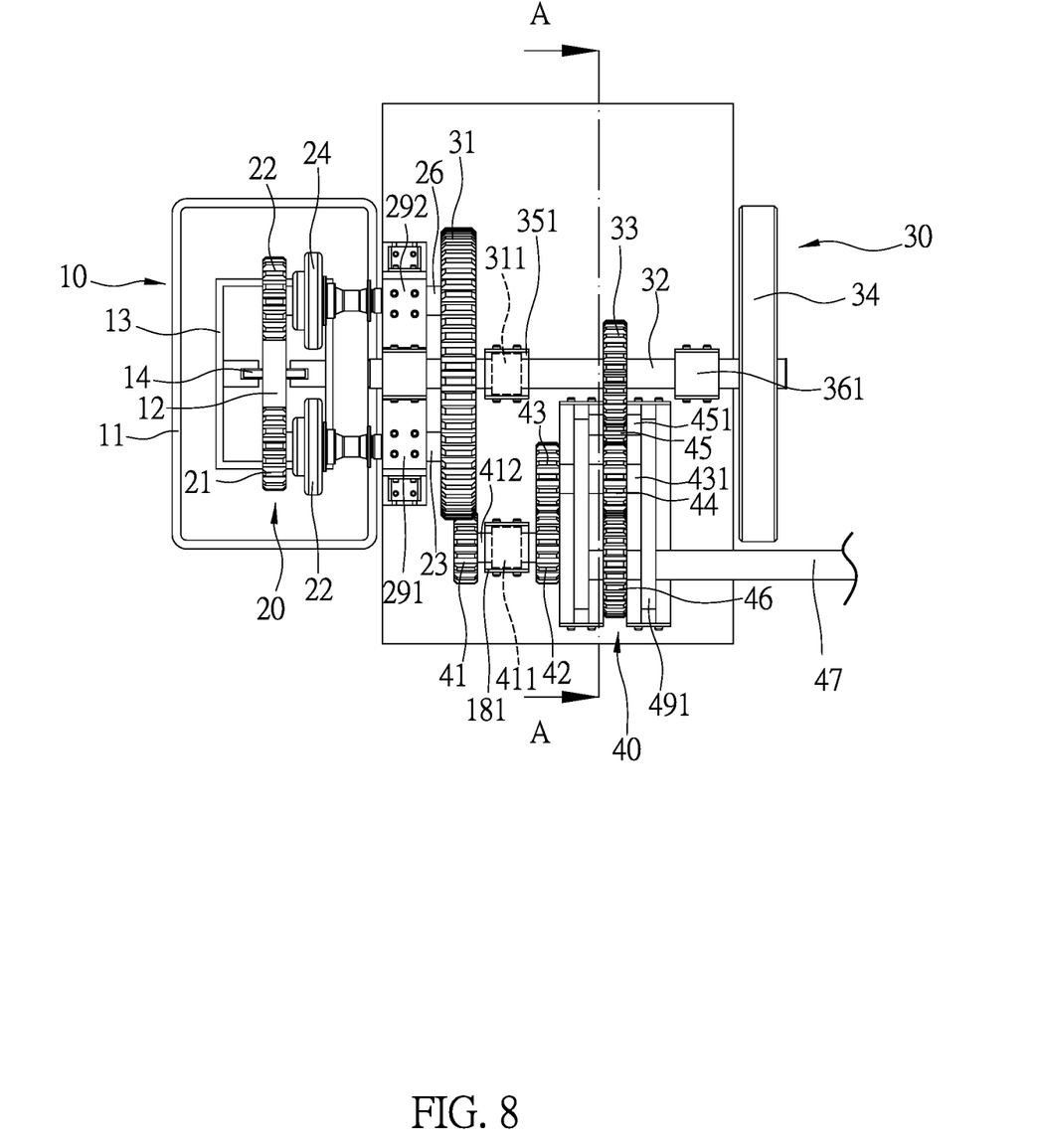
FIG. 8 is a top view of the preferred embodiment according to the present invention.
Figure 9:
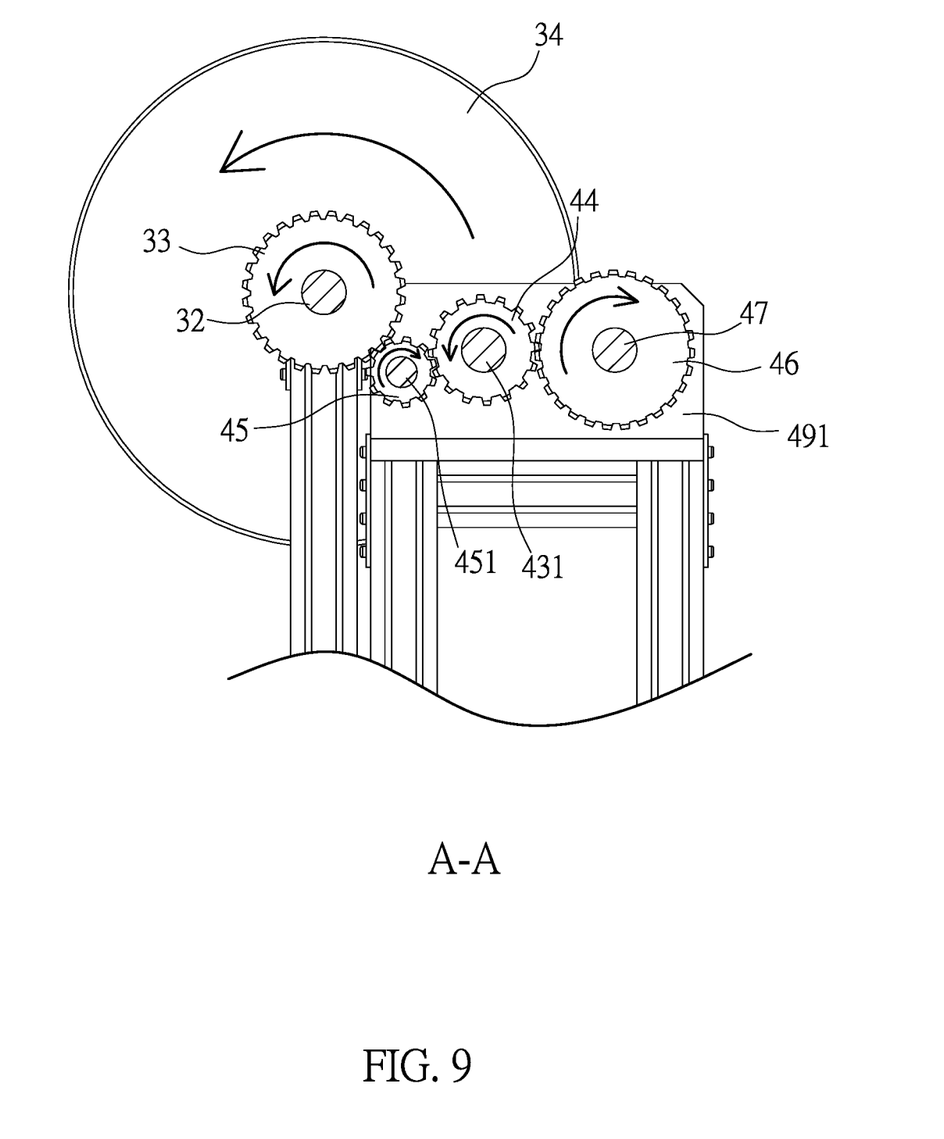
FIG. 9 is a cross-sectional view corresponding to the line A-A of FIG. 8 of the preferred embodiment according to the present invention.

Next, as shown in FIGS. 3 to 7, when the first operating gear 31 of the operating unit 30 rotates to generate kinetic energy, the first operating gear 31 engages with the first transmitting gear 41 of the transmission unit 40, so the kinetic energy is transmitted to the second transmitting gear 42 through the first transmitting gear 41, and the third transmitting gear 43 is driven by the second transmitting gear 42 and the fourth transmitting gear 44 synchronously rotate, and then the fourth transmitting gear 44 drives the sixth transmitting gear 46 to drive the transmitting shaft 47 to generate kinetic energy. Moreover, the first operating gear 31 also drives the idler wheel 34 to rotate through the driving shaft 32 to make the first operating gear 31 to generate kinetic energy continuously to be transmitted to the idler wheel 34. When the ocean waves is smaller, the rotational kinetic energy generated by the first and second gears 21, 22 of the gearing unit 20 is reduced, the rotational speed of the first operating gear 31 is reduced, at this time, the idler wheel 34, which has obtained kinetic energy and continues to rotate, has a speed greater than that of the first operating gear 31, thereby driving the driving shaft 32 to rotate and making the first operating gear 31 to be released due to the third one-way bearing 311, as the driving shaft 32 is in an idling state. As shown in FIGS. 8 and 9, the rotational kinetic energy generated by the driving shaft 32 is further through the second operating gear 33 sequentially passes through the fifth transmitting gear 45, the fourth transmitting gear 44 and the sixth transmitting gear 46, and finally the transmitting shaft 47 is driven by the sixth transmitting gear 46 to generate stable rotational kinetic energy, and the first transmitting gear 41 is also released from the second transmitting gear 42 through the fourth one-way bearing 413 to form an idling state to avoid energy loss caused by kinetic energy interference. On the contrary, if the fluctuation ocean wave energy increases, the rotational kinetic energy generated by the first and second gears 21, 22 of the gearing unit 20 increases, which increases the rotational power of the first operating gear 31 so that the rotational speed of the first operating gear 31 is greater than the rotational speed of the idler wheel 34, and the idler wheel 34 becomes driven by the first operating gear 31 to rotate, and also the transmitting shaft 47 is driven to generate rotational kinetic energy by the first transmitting gear 41.

Finally, as shown in FIG. 10, the energy generated by the transmitting shaft 47 is distributed to the generator 52 through the control chamber 51 for power generation, and the generated current is transmitted to the power company to provide people's daily requirement. If excess energy is generated, the energy can be distributed to the air compressor 53 through the control chamber 51 to compress air, and the compressed air is stored in the gas tank 54. When electricity is needed at time, the gas tank 54 transmits the gas via an air motor (not shown) to the generator 52 to generate electricity, and then transmits the generated current to the power company to provide various electricity usage.

With the structure of the above specific embodiment, the following benefits can be obtained: ocean waves drive the floating member 11 to move up and down, and then the gearing unit 20, the operating unit 30 and the transmission unit 40 converts the alternating potential energy into a rotational kinetic energy, which is then used for power generation. Furthermore, the operating unit 30 changes the driving state between the first and second operating gears 31 and 32 as the wave alternating potential energy increases or decreases. The transmitting shaft 47 generates energy through the rotation of one of the first transmitting gear 41 and the second transmitting gear 43 to achieve a continuous and stable energy output to improve the power generation efficiency of the energy converting device 50.

Although the present invention has been explained in relation to its preferred embodiment, it is to be understood that many other possible modifications and variations can be made without departing from the spirit and scope of invention as hereinafter claimed.

What is claimed is:

1. A wave energy converting device comprising:
a driving unit having a floating member with a driving column, two sides of the driving column respectively having a first toothed section and a second toothed section;
a gearing unit having a first gear and a second gear, the first and second gear respectively engaging with the first and second toothed section of the driving column, the first gear assembled with a first one-way bearing, the second gear assembled with a second one-way bearing, the first and second one-way bearings configured to rotate in a same direction, the first and second gears being respectively connected to an end of a first linking shaft and a second linking shaft with the first and second one-way bearing, another end of the first linking shaft connected to a third gear, another end of the second linking shaft connected to a fourth gear;
an operating unit having a first operating gear, a driving shaft, a second operating gear and an idler wheel, the first operating gear engaging with the third and fourth gears, the first operating gear coupled with a third one-way bearing and connected to an end of the driving shaft via the third one-way bearing, a middle section of the driving shaft engaging with the second operating gear, another end of the driving shaft connected to the idler wheel;
a transmission unit having at least one first transmitting gear, a second transmitting gear, a third transmitting gear, a fourth transmitting gear, a fifth transmitting gear, a sixth transmitting gear, and a transmitting shaft; the first transmitting gear engaging with the first operating gear, the first transmitting gear coupled with a fourth one-way bearing, the fourth one-way bearing connected to a first shaft, another end of the first shaft connected to the second transmitting gear, the second transmitting gear engaging with the third transmitting gear, the third transmitting gear connected to the fourth transmitting gear via a second shaft; the fifth transmitting gear and the sixth transmitting gear respectively engaging with the fourth transmitting gear on opposite sides, the fifth transmitting gear engaging with the second operating gear, the transmitting shaft placed through the sixth transmitting gear; and
an energy converting device having at least one generator connected to the transmitting shaft to generate electrical energy.

2. The wave energy converting device as claimed in claim 1, wherein the driving unit has a vertical track, the floating member is configured to move vertically along the vertical track, and the vertical track further has two guiding wheels, and the two guiding wheels abut two sides of the driving column.

3. The wave energy converting device as claimed in claim 1, wherein the gearing unit is installed on a first supporting structure, the first supporting structure comprises a first bearing seat and a second bearing seat at a same height, the first bearing seat and the second bearing seat configured to accept the first and second linking shafts, the first supporting structure further comprising a third bearing seat between the first and second bearing seats, the third bearing seat installed higher than the first and second bearing seats, the third bearing seat configured to accept an end of the driving shaft, a second supporting structure provided between the first operating gear and the second operating gear, the second supporting structure adjacent to the first operating gear and further comprising a fourth bearing seat on a top for accepting the driving shaft, a third supporting structure installed between the second operating gear and the idler wheel, and a fifth bearing seat is mounted on a top of the third supporting structure for accepting another end of the driving shaft.

4. The wave energy converting device as claimed in claim 1, wherein a fourth supporting structure is installed between the first transmitting gear and the second transmitting gear, a sixth bearing seat is mounted on a top of the fourth supporting structure for accepting the first shaft; the fourth transmitting gear, the fifth transmitting gear and the sixth transmitting gear are mounted on a fifth supporting structure; a housing is mounted on a top of the fifth supporting structure, the fourth, fifth and sixth transmitting gears engaging with each other and positioned in the housing, the second shaft passing through the housing and the fourth transmitting gear, and the housing further comprises a third shaft passing through the sixth transmitting gear.

5. The wave energy converting device as claimed in claim 4, wherein a circular area of the idler wheel is larger than a circular area of the first operating gear.

6. The wave energy converting device as claimed in claim 1, wherein the energy converting device further comprises a control chamber, a plurality of generators, at least one air compressor and a gas tank; wherein energy generated by the transmitting shaft is distributed via the control chamber to the generators and the air compressor connected to the gas tank.

\* \* \* \* \*